United States Patent Office 2,983,330
Patented May 9, 1961

2,983,330

METHOD OF MANUFACTURING POROUS BODIES FOR THE SEPARATION OF ISOTOPES

Paul Christiaan van der Willigen and Sjerp Anne Troelstra, Eindhoven, Netherlands, assignors to North American Philips Company, Inc., New York, N.Y., a corporation of Delaware No Drawing. Filed May 23, 1958, Ser. No. 737,198

Claims priority, application Netherlands June 13, 1957

8 Claims. (Cl. 183—2)

This invention relates to methods of manufacturing porous bodies suitable for separating the hexafluorides of the isotopes $U^{238}$ and $U^{235}$ by means of diffusion through such bodies. The invention also relates to porous bodies manufactured by such methods and to devices for separating the hexafluorides of the isotopes $U^{238}$ and $U^{235}$ by means of diffusion through such bodies.

Several methods are known for separating the isotopes $U^{238}$ and $U^{235}$. One of the methods most employed utilizes the difference in speed of diffusion of the compounds $U^{238}F_6$ and $U^{235}F_6$ through a porous wall. This method is fundamentally very simple. A mixture of the hexafluorides of $U^{238}$ and $U^{235}$ flows through a porous body, for example a porous tube. The composition of the gas mixture before entering and behind the porous body is different from the composition leaving the porous body in that, the content of $U^{235}F_6$ in the gas mixture has increased.

In addition to the very extensive equipment required to bring about an effective separation of the two isotopes, the choice of the porous wall has been found to be very critical in this process, which is attributable to two facts. Firstly, the hexafluorides of the two uranium isotopes are chemically very active (comparable to the activity of fluorine itself) and secondly, very little information is available about the pore size in the body which serves as a partition. The optimum size of the pores is thus not known exactly. It has been mentioned however in the literature that it must be approximately $0.01\mu$.

As a result of the great chemical activity of hexafluorides, it is hardly possible to prevent the porous partition from being chemically attacked. If this chemical attack results in volatile products, the gas mixture flowing through the porous body is contaminated with them. It is even more disadvantageous if the chemical attack by the hexafluorides results in non-volatile products, since such products cause the pores to be choked. It will be evident that the speed of separation is thus detrimentally affected.

The present invention relates to a method of manufacturing a porous body in which the above-mentioned disadvantages occur only to a very small extent.

A process according to the invention for manufacturing a porous body suitable for separating the hexafluorides of the isotopes $U^{238}$ and $U^{235}$ by means of diffusion through this body is characterized in that a body of the desired shape is manufactured from a plastic mass of calcium fluoride and a binder consisting of a gel of calcium fluoride prepared with the use of an aqueous solution of a jellifying agent which upon heating at a temperature between 100° C. and 1200° C. dissociates into volatile substances and/or substances which are substantially not attacked by the hexafluorides, said body after shaping being heated to a temperature between 100° C. and 1200° C. until the binder has dissociated, the water has been expelled and a solid body is obtained which can properly be handled.

The calcium fluoride is a material which is substantially not chemically attacked by the hexafluorides of uranium. It is thus particularly advantageous to utilize this substance for the partitions in the separation of the two isotopes. However, calcium fluoride is a mineral which is not porous per se and it is therefore necessary to form it into a porous body. Now, it has been found that calcium fluoride can be converted into the gel state by means of an aqueous solution of a jellifying agent and that it is possible to bind mineral granular calcium fluoride with this calcium-fluoride gel and to manufacture from the resultant plastic mass, for example by moulding or extrusion, bodies of practically arbitrary shape, for example plates or tubes.

It will be evident that such plastic bodies cannot be used as such for the separation of the isotopes. However, it has been found that solid, rigid and hence bodies which can properly be handled are obtained by heating these plastic bodies at a temperature between 100° and 1200° C., approximately in the same manner as in baking ceramic products. Such bodies then consist for the greater part of pure calcium fluoride, which has a porous structure as a result of its manufacturing process. The jellifying agent used therefor consists of substances which, upon heating at a temperature between 100° and 1200° C., dissociate into volatile materials, which thus escape, and/or into substances which are no more chemically attacked by the uranium hexafluorides than the calcium fluoride. It is important that the heating be continued until substantially all the water has been expelled. Then, a solid body which can properly be employed in the separation of the isotopes is obtained.

As previously mentioned, a porous body is obtained. It has been found that the size of pores of this body is surprisingly small, which is attributable to the size of particles in the calcium-fluoride gel. These particles are very small (from 0.02 to $0.03\mu$) as may appear from photographs taken with the aid of an electron microscope. However, the size of pores may be regulated in different ways. First of all, the starting material used may be a mineral calcium fluoride having a coarser or finer grain. The finer the calcium fluoride, the smaller are the pores. Furthermore, it appears that the size of pores increases with the heating temperature and with the time of heating. An excellent means is thus available for providing a given size of pores. This is connected with the remarkable and particularly advantageous phenomenon that the bodies produced substantially do not contract during heating. Consequently, the process may be carried out in a manner such that the size of pores is optimum for the separation of the hexafluorides of the isotopes $U^{238}$ and $U^{235}$.

Finally, if no difficult requirements are to be imposed upon the extrudability of the plastic mass, it is possible to reduce the ratio of the amount of gel to the amount of mineral fluor spar, which results in larger pores.

Alkaline-earth permanganates and more particularly calcium permanganate are particularly suitable as jellifying agents, since such permanganates dissociate at a temperature below 200° C. in oxygen to produce alkaline-earth manganite, and $MnO_2$. The last-mentioned two substances are chemically attacked by the hexafluorides only to a small extent. When bodies thus formed are further heated to temperatures above 600° C. for the purpose of controlling the size of pores, the $MnO_2$ is converted into $Mn_2O_3$, which is chemically attacked by the hexafluorides to an even smaller extent.

Another jellifying agent which can be used very well is cuprinitrate which, upon heating at about 250° C., dissociates into CuO, which is also substantially not attacked by the hexafluorides. During dissociation, nitrogen oxides escape.

Uranyl nitrate is also very suitable as a jellifying agent. It dissociates upon heating into nitrogen oxides and uranium dioxide, which is chemically attacked by the hexafluorides of uranium only to a small extent.

A jellifying agent which dissociates completely and may be used for manufacturing porous bodies of the above-described kind is ammonium nitrate.

The invention will now be explained more fully with reference to the examples following hereinafter.

*Example I*

44 grams of dry precipitated calcium fluoride are stirred with 50 millilitres of an aqueous solution of 6 grams of calcium permanganate. After stirring for a few minutes, a viscous, Vaseline-like substance has formed. This gel is mixed with 270 grams of finely-pulverized mineral calcium fluoride having a size of grain smaller than 125 microns. The resultant paste is extruded by means of a suitable machine into the form of a tube. This tube is then heated at 200° C. for 1 hour, resulting in a tube having the appearance of dark-coloured ceramic material. The body obtained is very strong and impervious to water.

If desired, the $MnO_2$ or $Mn_2O_3$ may be removed from the bodies by treatment with HCl, followed by washing with water. The pores then also become a little larger.

*Example II*

950 grams of an aqueous 42%-solution of HF are poured on 1000 grams of $CaCo_3$. The HF is allowed to react upon the $CaCo_3$ for about 30 minutes. Subsequently, the reaction mixture is filtered through a glass the filter. 528 grams of the moist powder which remains on the filter are ground for 5 minutes. Subsequently, 77 grams of $Cu(NO_3)_2.3H_2O$ are added and mixed for 45 minutes to form a fatty gel. 525 grams of this gel are mixed with 610 grams of mineral calcium fluoride having a size of grain smaller than 100 microns. A paste then results, which is formed into a porous body in the same manner as described in Example I.

*Example III*

The same process is followed as described in Example II, but instead of 77 grams of $Cu(NO_3)_2.3H_2O$, use is made of 100 grams of $UO_2(NO_3)_2.6H_2O$.

*Example IV*

200 grams of $CaF_2$
80 grams of $NH_4NO_3$
12 grams of $H_2O$ are mixed for 30 minutes so as to form a Vaseline-like gel. 290 grams of this gel are mixed with 300 grams of mineral $CaF_2$ having a grain size smaller than 125 microns.

Tubes are formed from the resultant paste and dried at 170° C. for half an hour. After drying, the tubes are comparatively brittle. They are subsequently heated to a temperature of 1000° C. within a period of about 1 hour. During this process, the $NH_4NO_3$ partly sublimates and partly dissociates. After this heating phase, the tubes are again strong and can easily be handled.

What is claimed is:

1. A method of manufacturing a solid porous body particularly adapted for the separation of the hexafluorides of the isotopes $U^{238}$ and $U^{235}$ by means of the different rates of diffusion of these hexafluorides through a porous body comprising the steps, mixing dry calcium fluoride and a gel formed of calcium fluoride and an aqueous solution of a jellifying agent, said jellifying agent upon being heated at a temperature between 100° C. and 1200° C. dissociating only into volatile substances and non-volatile substances substantially inert to the hexafluorides, forming the resultant mixture into a mass of the desired shape and heating said shaped mass at a temperature between 100° C. and 1200° C. for a time sufficient to dissociate said gel, expell the water and any volatile substances formed by the dissociation of the gel.

2. The method of claim 1 in which the jellifying agent is calcium permanganate.

3. The method of claim 1 in which the jellifying agent is cupric nitrate.

4. The method of claim 1 in which the jellifying agent is uranyl nitrate.

5. The method of claim 1 in which the jellifying agent is ammonium nitrate.

6. The method of claim 1 in which the jellifying agent is an alkaline earth permanganate.

7. The method of claim 1 in which, after heating, the resultant body is treated with a dilute solution of hydrochloric acid.

8. A porous body produced by the method of claim 1.

References Cited in the file of this patent

UNITED STATES PATENTS 2,454,921　　Heinemann　　　　Nov. 30, 1948

OTHER REFERENCES

Mellor: Comprehensive Treatise on Inorganic and Theoretical Chemistry, vol. 3, pages 688, 689 and 695 (1922), Longmans, Green & Co., London.